(12) United States Patent
Bell, Jr. et al.

(10) Patent No.: US 8,515,882 B2
(45) Date of Patent: Aug. 20, 2013

(54) EFFICIENT STORAGE OF INDIVIDUALS FOR OPTIMIZATION SIMULATION

(75) Inventors: Robert H. Bell, Jr., Austin, TX (US); Jason F. Cantin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/948,850

(22) Filed: Nov. 18, 2010

(65) Prior Publication Data

US 2012/0130928 A1    May 24, 2012

(51) Int. Cl.
  *G06F 15/18* (2006.01)
  *G06N 3/00* (2006.01)
  *G06N 3/12* (2006.01)

(52) U.S. Cl.
  USPC .......................................................... 706/13

(58) Field of Classification Search
  USPC .......................................................... 706/13
  See application file for complete search history.

(56) References Cited

U.S. PATENT DOCUMENTS

| | | | |
|---|---|---|---|
| 5,343,554 A | 8/1994 | Koza et al. |
| 5,363,098 A | 11/1994 | Antoshenkov |
| 5,390,283 A | 2/1995 | Eshelman et al. |
| 5,443,076 A | 8/1995 | Bau |
| 5,651,099 A | 7/1997 | Konsella |
| 5,742,738 A | 4/1998 | Koza et al. |
| 5,857,196 A | 1/1999 | Angle et al. |
| 5,946,674 A | 8/1999 | Nordin et al. |
| 6,031,935 A | 2/2000 | Kimmel |
| 6,057,424 A | 5/2000 | Vail |
| 6,058,385 A | 5/2000 | Koza et al. |
| 6,128,607 A | 10/2000 | Nordin et al. |
| 6,260,031 B1 | 7/2001 | Schaffer et al. |
| 6,442,582 B1 | 8/2002 | Hale |
| 6,532,453 B1 | 3/2003 | Koza et al. |
| 6,539,366 B1 | 3/2003 | Doyle et al. |

(Continued)

FOREIGN PATENT DOCUMENTS

| | | |
|---|---|---|
| WO | WO-9963997 | 12/1999 |
| WO | WO-0167186 | 9/2001 |

(Continued)

OTHER PUBLICATIONS

Fast music information retrieval using PAT tree based dynamic time warping, ZongChao Cheng; ChingShun Lin; YiHen Chen; Information, Communications and Signal Processing (ICICS) 2011 8th International Conference on Topic(s): Communication, Networking & Broadcasting ; Components, Circuits, Devices & Systems, Publication Year: 2011 , pp. 1-5.*

(Continued)

*Primary Examiner* — Michael B Holmes
(74) *Attorney, Agent, or Firm* — DeLizio Gilliam, PLLC

(57) ABSTRACT

Candidate solutions to an optimization problem comprise a set of potential values that can be applied to variables in a problem description. Candidate solutions can be large because of the complexity of optimization problems and large number of variables. The populations of candidate solutions may also be large to ensure diversity and effectiveness in computing a solution. When the populations and the candidate solutions are large for an optimization problem, computing a solution to the optimization problem consumes a large amount of memory. In some instances, several generations of candidate solutions are stored in memory. Compression of the candidate solutions can minimize the memory space consumed to compute a solution to an optimization problem.

25 Claims, 5 Drawing Sheets

(56) References Cited

U.S. PATENT DOCUMENTS

| | | | |
|---|---|---|---|
| 6,553,357 B2 | 4/2003 | Mathias et al. | |
| 6,691,285 B1 | 2/2004 | Burden et al. | |
| 6,725,326 B1 | 4/2004 | Patra et al. | |
| 6,882,989 B2 | 4/2005 | Stevens | |
| 7,031,887 B2 | 4/2006 | Jain et al. | |
| 7,037,735 B2 * | 5/2006 | Noguchi et al. | 438/18 |
| 7,043,463 B2 | 5/2006 | Bonabeau et al. | |
| 7,045,674 B2 | 5/2006 | Davisson | |
| 7,098,055 B2 * | 8/2006 | Noguchi et al. | 438/18 |
| 7,191,168 B1 | 3/2007 | Buchsbaum et al. | |
| 7,313,666 B1 | 12/2007 | De Silva et al. | |
| 7,383,235 B1 | 6/2008 | Ulyanov et al. | |
| 7,443,496 B2 * | 10/2008 | Noguchi et al. | 356/237.2 |
| 7,451,121 B2 | 11/2008 | Wu et al. | |
| 7,469,237 B2 | 12/2008 | Cooper | |
| 7,514,407 B2 | 4/2009 | Averback | |
| 7,560,248 B1 | 7/2009 | Raines | |
| 7,603,326 B2 | 10/2009 | Bonabeau et al. | |
| 7,616,763 B2 * | 11/2009 | Le Buhan et al. | 380/239 |
| 7,639,350 B2 * | 12/2009 | Noguchi et al. | 356/237.2 |
| 7,692,779 B2 * | 4/2010 | Noguchi et al. | 356/237.5 |
| 7,743,150 B1 * | 6/2010 | Carter et al. | 709/227 |
| 7,940,383 B2 * | 5/2011 | Noguchi et al. | 356/237.2 |
| 8,140,766 B2 * | 3/2012 | Bell et al. | 711/133 |
| 8,312,455 B2 * | 11/2012 | Bell et al. | 718/100 |
| 8,327,126 B2 * | 12/2012 | Bell et al. | 713/100 |
| 8,352,712 B2 * | 1/2013 | Bell et al. | 712/225 |
| 8,370,584 B2 * | 2/2013 | Cantin et al. | 711/152 |
| 8,379,847 B2 * | 2/2013 | Bell et al. | 380/44 |
| 8,397,030 B2 * | 3/2013 | Cantin et al. | 711/141 |
| 2002/0016782 A1 | 2/2002 | Cooper | |
| 2002/0019975 A1 | 2/2002 | Johnson | |
| 2002/0120407 A1 | 8/2002 | Stevens | |
| 2002/0183510 A1 | 12/2002 | Vail | |
| 2003/0028578 A1 | 2/2003 | Jain | |
| 2004/0002460 A1 | 1/2004 | Averback | |
| 2004/0008883 A1 | 1/2004 | Shi et al. | |
| 2004/0024750 A1 | 2/2004 | Ulyanov et al. | |
| 2004/0029809 A1 | 2/2004 | Averback | |
| 2004/0133929 A1 | 7/2004 | Davisson | |
| 2004/0254901 A1 | 12/2004 | Bonabeau et al. | |
| 2006/0195204 A1 | 8/2006 | Bonabeau et al. | |
| 2007/0116267 A1 | 5/2007 | Speirs et al. | |
| 2007/0172828 A1 | 7/2007 | Schaffer et al. | |
| 2008/0103995 A1 | 5/2008 | Mohamed et al. | |
| 2009/0150080 A1 | 6/2009 | Dawkins et al. | |
| 2009/0252718 A1 | 10/2009 | Jeyaseelan et al. | |
| 2009/0292180 A1 | 11/2009 | Mirow | |
| 2010/0113397 A1 | 5/2010 | Wong et al. | |

FOREIGN PATENT DOCUMENTS

| | | |
|---|---|---|
| WO | WO-03074558 | 9/2003 |
| WO | WO-2004104029 | 12/2004 |
| WO | WO-2005078629 | 8/2005 |
| WO | WO-2006135345 | 12/2006 |
| WO | WO-2007123923 | 11/2007 |

OTHER PUBLICATIONS

A Study on Automatic Extraction of New Terms, Xing Zhang; Fang, A.C., Knowledge Acquisition and Modeling (KAM), 2011 Fourth International Symposium on Topic(s): Communication, Networking & Broadcasting ; Components, Circuits, Devices & Systems ; Computing & Processing (Hardware/Software) Publication Year: 2011 , pp. 599-602.*

"Crossover and Mutation", http://www.obitko.com/tutorials/genetic-algorithms/crossover-mutation.php Marek Obitko, 1998 , 1 page.

Reeves, Colin , "Kluwewer's International Series—Handbook of Metaheuristics", *WebSite Link:* http://sci2s.ugr.es/docencia/algoritmica/GeneticAlgorithms.pdf Chapter 3 School of Mathematical and Information Sciences, Coventry University Priory St, Coventry CV1 5FB, E-mail: C. Reeves@conventry. ac.uk http://www.mis.coventry.ac.uk/~colinr/ 2003 , 28 pages.

Affenzeller, Michael et al., "Genetic Algorithms and Genetic Programming: Modern Concepts and Practical Applications", *CRC Press*, 2009 http://www.crcpress.com/product/isbn/9781584886297 Apr. 9, 2009 , pp. 138-139.

Baluja, Shumeet , "Genetic Algorithms and Explicit Search Statistics", *Justsystem Pittsburgh Research Center & School of Computer Science, Carnegie Mellon University* 1997 , 7 pages.

Bright, Marc et al., "An Efficient Random Number Generation Architecture for Hardware parallel Genetic Algorithms", *Lecture Notes In Computer Science*; vol. 1917, pp. 583-588, Year of Publication: 2000 ISBN:3-540-41056-2 Publisher: Springer-Verlag 2000 , pp. 583-588.

Colton, Simon , "Lecture 16 Genetic Algorithms", http://www.doc.ic.ac.uk/~sgc/teaching/v231/lecture16.html 2004 , 8 pages.

U.S. Appl. No. 12/954,296, filed Nov. 24, 2010, Cantin, Jason F.

Dubrovsky, Opher et al., "A Genetic Algorithm with a Compact Solution Encoding for the Container Ship Stowage Problem", *Journal of Heuristics*, vol. 8 , Issue 6 (Nov. 2002) pp. 585-599 Year of Publication: 2002, ISSN:1381-1231 http://portal.acm.org/citation.cfm?id=594958.595104&coll=GUIDE&dl=GUIDE&CFID=91858704&CFTOKEN=76504727 Nov. 2002 , pp. 585-599.

Greenwell, R.N. et al., "Optimal Mutation Probability for Genetic Algorithms", *Mathematical and Computer Modelling* vol. 21, No. 8, Apr. 1995 , pp. 1-11 http://www.ingentaconnect.com/content/els/08957177/1995/00000021/00000008/art00035 Apr. 1995 , pp. 1-11.

Pal, Sankar K. et al., "Genetic algorithms for pattern recognition", *CRC Press*, 1996, pp. 69-72 http://www.crcpress.com/product/isbn/9780849394676;jsessionid=RF4Kz1IhxMO3zF3u8Z8sRQ** 1996 , p. 69.

* cited by examiner

EFFICIENT STORAGE OF INDIVIDUALS FOR OPTIMIZATION SIMULATION

BACKGROUND

Embodiments of the inventive subject matter generally relate to the field of data processing and, more particularly, to compression and decompression in computer-based metaheuristics.

Population-based optimization algorithms are used to find solutions to optimization problems by starting with an initial set of candidate solutions (e.g., provided by a user, randomly generated, etc.) and iteratively analyzing and modifying the candidate solutions. The candidate solutions are iteratively analyzed and modified according to an objective function until reaching a satisfactory solution. Population-based optimization algorithms may also be referred to as metaheuristic optimization algorithms, combinatorial optimization algorithms, soft-computing algorithms, etc. For instance, one type of population-based optimization algorithm is an evolutionary algorithm.

An evolutionary algorithm uses biological techniques loosely based on biological evolution, reproduction, mutation, recombination, and natural selection to find solutions to optimization problems. Simulations that implement evolutionary algorithms act upon populations. Individuals within a population represent candidate solutions to an optimization problem. The candidate solutions are evaluated for fitness (i.e., evaluated according to a fitness function) and the population "evolves" as successive generations of the population are selected/generated and modified loosely based on the biological techniques. As the population evolves, overall fitness of the population tends to increase. A solution to the optimization problem is found when the overall fitness of the population has reached a satisfactory level, or in other words, when the fitness function, or other objective function, evaluates to an optimal solution. Simulations based on population-based optimization algorithms, such as evolutionary algorithms, can perform well for finding solutions to problems in engineering, biology, economics, robotics, etc. because objective functions can be tailored to fit the problems.

SUMMARY

Embodiments include a method for determining a difference comparison key for a plurality of individuals. Each of the individuals comprises a candidate solution for an optimization problem. A plurality of logical differences between the difference comparison key and the plurality of individuals are computed. Each of the logical differences is compressed to generate a plurality of compressed individuals. The plurality of compressed individuals is used in an optimization simulation to generate a solution for the optimization problem.

A computer program product for compressing and decompressing a plurality of individuals. The computer program product comprises a computer readable storage medium having computer readable program code embodied therewith. The computer readable code is configured to determine a difference comparison key for the plurality of individuals, wherein each of the individuals comprises a candidate solution for an optimization problem. The computer readable code is also configured to decompress a first of a plurality of compressed individuals to generate a first of a plurality of logical differences, wherein each of the compressed individuals represent a candidate solution to an optimization problem. Then, the computer readable code evaluates a fitness of the first of the plurality of the logical differences while others of the plurality of compressed individuals remain compressed.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, embodiments can be applied to a variety of population based algorithms, such as genetic algorithms, evolution strategy, evolutionary programming, genetic programming, and are not limited to the evolutionary algorithms described herein. Embodiments can also optimize groups of candidate solutions (i.e., particle swarm optimization) rather than generations. In other instances, well-known instruction instances, protocols, structures and techniques have not been shown in detail in order not to obfuscate the description.

The candidate solutions to an optimization problem comprise a set of potential values that can be applied to variables in the problem description. For example, an electronic design may be optimized. Variables in the electronic design can include transmission line length, transmission line spacing, driver strengths, etc. The candidate solutions represent a set of potential values that can be applied to the line length, transmission line spacing, and driver strength variables in the electronic design. Usually, an initial generation (i.e., generation "1") of candidate solutions is randomly chosen based on a domain of the optimization problem. The randomly generated initial generation tends to be unfit, so it can take many generations before a satisfactory level of fitness is reached.

Candidate solutions can be large because of the complexity of optimization problems and large number of variables. The generations of candidate solutions may also be large to ensure diversity and effectiveness in computing a solution. When the generations and the candidate solutions are large for an optimization problem, computing a solution to the optimization problem consumes a large amount of memory. Compression of the candidate solutions can minimize the memory space consumed to compute a solution to an optimization problem. In some instances, several generations of candidate solutions are stored in memory, which results in a larger number of candidate solutions to search during evaluation. When an exact match of a candidate solution is found in a previous generation stored in memory, computation time used for evaluation can be saved because the candidate solution may not be evaluated.

Figure 1:
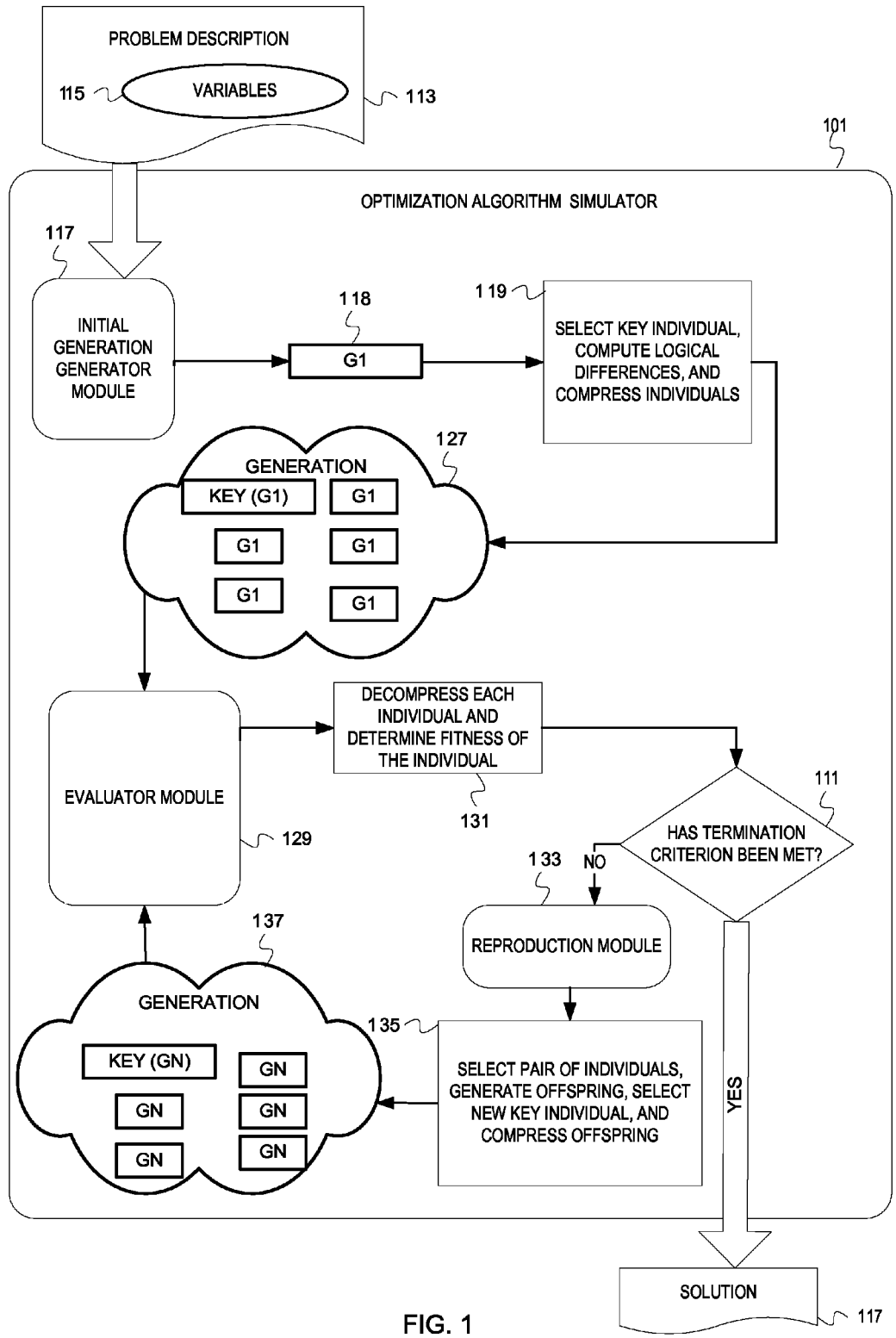
FIG. 1 is an example conceptual diagram of compression and decompression methods used during the generation and reproduction of a generation of candidate solutions during an optimization algorithm simulation.

FIG. 1 is an example conceptual diagram of compression and decompression during the generation and reproduction of a generation of candidate solutions during an optimization algorithm simulation. An optimization algorithm simulator 101 receives an optimization problem description (also referred to herein as a "problem description") 113. The problem description 113 defines the optimization problem. Examples of optimization problems include circuit design, adder design, compiler tuning, etc. The problem description 113 includes variables of the optimization problem 115, a domain for the candidate solutions, a fitness evaluation function, seed candidate solutions, criteria for inserting the seed candidate solutions, termination criteria, etc. In some embodiments, the problem description 113 is included in a specification file. Other embodiments, however, do not utilize a specification file, but instead ascertain the problem description 113 by accessing hard coded instructions, linked information, data input from a user via a graphical user interface, etc.

The optimization algorithm simulator 101 then sends the problem description 113, which includes variables 115, to an initial generation generator module 117. The initial generation generator module 117 generates a first generation ("G1") based on the problem description 113 and the variables 115. In some instances, the first generation includes a number of randomly created individuals 118. Each individual 118 represents a possible candidate solution for the optimization problem. Each of the candidate solutions is represented by a dataset organized based on the variables 115 of the optimization problem. Each dataset stores a value for each of the variables 115. The optimization algorithm simulator 101 determines a number of candidate solutions to generate based on the problem description 113. For example, the problem description 113 can indicate that the first generation should comprise one hundred candidate solutions. Some embodiments may store and use candidate solutions as arrays instead of, or in addition to, strings of values. Some embodiments may store and use candidate solutions as lists of numbers which are indexes into an instruction table, nodes in a linked list, hashes, objects, or other data structures.

The initial generation generator module 117 then selects an individual from the first generation as the difference comparison key (119). After the difference comparison key has been selected by the initial generation generator module 117, a logical difference is computed between the difference comparison key and each of the other individuals in the first generation (119). Each of these logical differences is then compressed by the initial generation generator module 117 using a compression algorithm to generate compressed individuals. The result is a compressed first generation 127, which can include an uncompressed difference comparison key and the compressed individuals. The difference comparison key remains uncompressed and is used to compute the individuals in the first generation from their corresponding logical differences. The uncompressed difference comparison key is represented as a larger box (Key G1) in the compressed first generation 127, while the compressed individuals are represented as smaller boxes (G1). In some embodiments, each individual is compressed after generation, but before a subsequent individual is generated. This minimizes the amount of memory used to store the first generation because the entire first generation does not reside in memory in an uncompressed state. In other embodiments, the entire first generation is generated before compression, which uses a larger amount of memory to store the first generation. In some embodiments, a bit indicator is stored with each individual. The bit indicator indicates if the individual is compressed or uncompressed.

After generating the compressed first generation 127, the optimization algorithm simulator 101 sends the compressed first generation 127 to the evaluator module 129. Candidate solutions can be decompressed one at a time, which minimizes the memory used to store generations (131). Each candidate solution is then restored by computing the logical difference between the difference comparison key and the decompressed logical difference of the candidate solution. The optimization algorithm simulator 101 then evaluates each candidate solution based on applying the values indicated in the candidate solutions to variables in the optimization problem and running a simulation of the candidate solution. For example, the problem description 113 can define an electronic design. The optimization algorithm simulator 101 can generate simulation decks for each candidate solution based on applying the values indicated by each candidate solution to variables of the electronic design. The optimization algorithm simulator 101 can run a simulation of each simulation deck using a Simulation Program with Integrated Circuit Emphasis (SPICE) simulation tool and collect results of each simulation. As another example, the problem description 113 indicates a computer program to be optimized. The optimization algorithm simulator 101 can run the computer program for each of the candidate solutions by applying the values of the candidate solutions to variables of the computer program. The optimization algorithm simulator 101 can collect results of each run of the computer program. The techniques (e.g., SPICE simulations, running computer programs, etc.) for evaluating the generation can be defined as part of the fitness evaluation function indicated in the problem description 113.

After a candidate solution has been evaluated, the candidate solution can be stored in a data structure, such as a hash tree. The data structure can store the value of the candidate solution and the results of the evaluation of the candidate solution. In some embodiments, before a candidate solution is evaluated, the values in the data structure are compared to the candidate solution to determine if the data structure contains an identical match to the candidate solution. If the candidate solution was evaluated in a previous generation, finding a match for the candidate solution in the data structure can save the computation time used for evaluation. After a candidate solution has been stored in the data structure, the logical difference of the candidate solution can be calculated and the logical difference of the candidate solution can be compressed while a second candidate solution is decompressed for evaluation. Decompressing candidate solutions for evaluation and maintaining other candidate solutions in the compressed state reduces the amount of memory consumed to evaluate a generation since less than all candidate solutions (e.g., one candidate solution) are in a decompressed state at any given time. In some embodiments, both a compressed and decompressed version of the candidate solution exists. After the candidate solution is evaluated, the decompressed version of the candidate solution can be discarded.

The optimization algorithm simulator 101 further determines fitness of the individuals of a generation (131). The fitness is represented by a numerical value within a range specified in the problem description 113. For example, the fitness can be represented by a percentage. Determining fitness of the individuals of a generation 131 comprises determining individual fitness metrics of each uncompressed logical difference of a candidate solution. The optimization algorithm simulator 101 determines each candidate solution's individual fitness metric based on the fitness evaluation function indicated in the problem description 113. For example, the optimization algorithm simulator 101 can analyze the simulation results of each candidate solution based on indicated heuristics. The optimization algorithm simulator 101 also determines the fitness of a generation based on aggregating the individual fitness metrics. For example, the optimization algorithm simulator 101 can average the individual fitness metrics. As another example, the optimization algorithm simulator 101 can take the median of the individual fitness metrics.

The optimization algorithm simulator 101 further determines if a termination criterion has been met (111). The problem description 113 indicates the termination criterion. For example, the optimization algorithm simulation may terminate when fitness of a generation reaches an indicated satisfactory level. As another example, the optimization algorithm simulation may terminate when fitness of a generation reaches a plateau. As another example, the optimization algorithm simulation may terminate when a specified number of generations has been reached. A problem description can indicate multiple and/or alternative termination criteria. The optimization algorithm simulator 101 outputs a solution 117 when the termination criterion is met. The solution 117 can comprise indications of each of the candidate solutions that constitute a generation at termination, individual fitness metrics of each of the candidate solutions, simulation/test results, etc.

If the termination criterion has not been met, the optimization algorithm simulator 101 determines (e.g., generates) a next generation in the reproduction module 133. For example, the current generation is generation "1" so the optimization algorithm simulator 101 then determines a generation "2." The optimization algorithm simulator 101 can determine the next generation in accordance with a biological technique or a combination of biological techniques loosely based on evolution, reproduction, mutation, recombination, and natural selection.

The reproduction module 133 decompresses the compressed generation received from the evaluator module 129. The reproduction module 133 then selects two fit individuals from the generation (135) and performs a crossover (reproduction), which produces the next generation of offspring (135). In some instances, the reproduction module 133 can select a new difference comparison key from the offspring (135). If a new difference comparison key is selected, then a logical difference is calculated between the previous difference comparison key and the new difference comparison key. A logical difference between each of the offspring and the logical difference between the previous difference comparison key and the new difference comparison key is then computed. The resulting logical difference of each offspring individual is compressed using a compression algorithm (135). The result of the reproduction module is a subsequent generation 137 ("GN"), in which there is one uncompressed new difference comparison key and a number of compressed individuals.

After the next generation is determined, the optimization algorithm simulator 101 repeats the generation evaluation 129 and determination of fitness (131) on the individuals of the next generation. It is then determined if termination criterion has been met (111). The reproduction module 133 selects a new key and generates a new generation (135). The evaluator module 129 then evaluates the generation before the fitness of the individuals is determined (131). The flow repeats for each successive generation until termination criterion is met.

Figure 2:
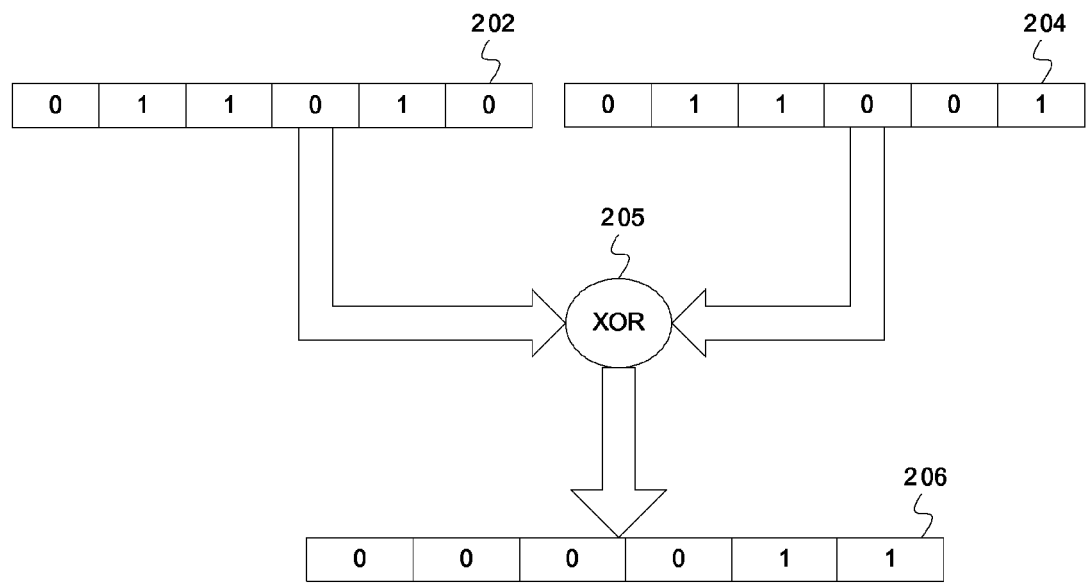
FIG. 2 is an example conceptual diagram of computing a logical difference between two individuals.

FIG. 2 depicts an example logical difference operation 205 between two individuals in a generation. The difference comparison key 202 includes a string of bits with values "011010." In this example, the second individual 204 contains a string of bits with values "011001."

A logical difference is calculated by comparing two corresponding bit values in two separate bit strings or individuals. In other words, the first bit of each individual is compared before comparing the second bit of each individual. The remaining bits in the individuals are compared in a similar manner. If corresponding bit values are different, then the result is "1." If the corresponding bit values are the same, then the result is "0." For example, the first four bits in the difference comparison key 202 and the second individual 204 contain the same values. Therefore, the logical difference 206, which stores the results of the logical difference operation 205, contains a "0" in the first four bits. However, the last two bits of the difference comparison key and the second individual contain different corresponding bits. The corresponding results bits in the logical difference string, therefore, contain two "1" values.

Figure 3:
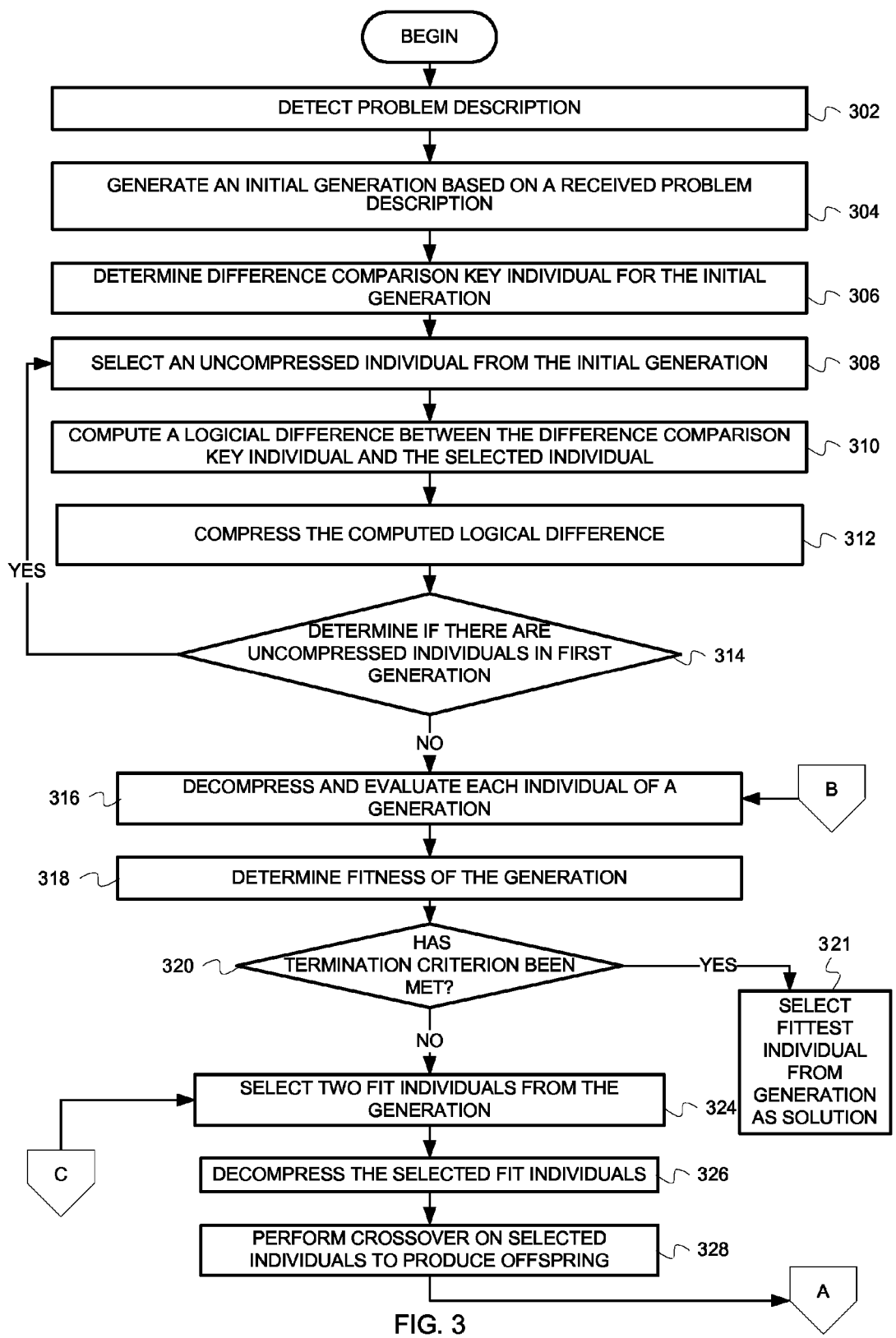
FIG. 3 and FIG. 4 are flowcharts depicting example operations for generating a generation of candidate solutions, while using compression and decompression operations during an optimization algorithm simulation.
Figure 4:
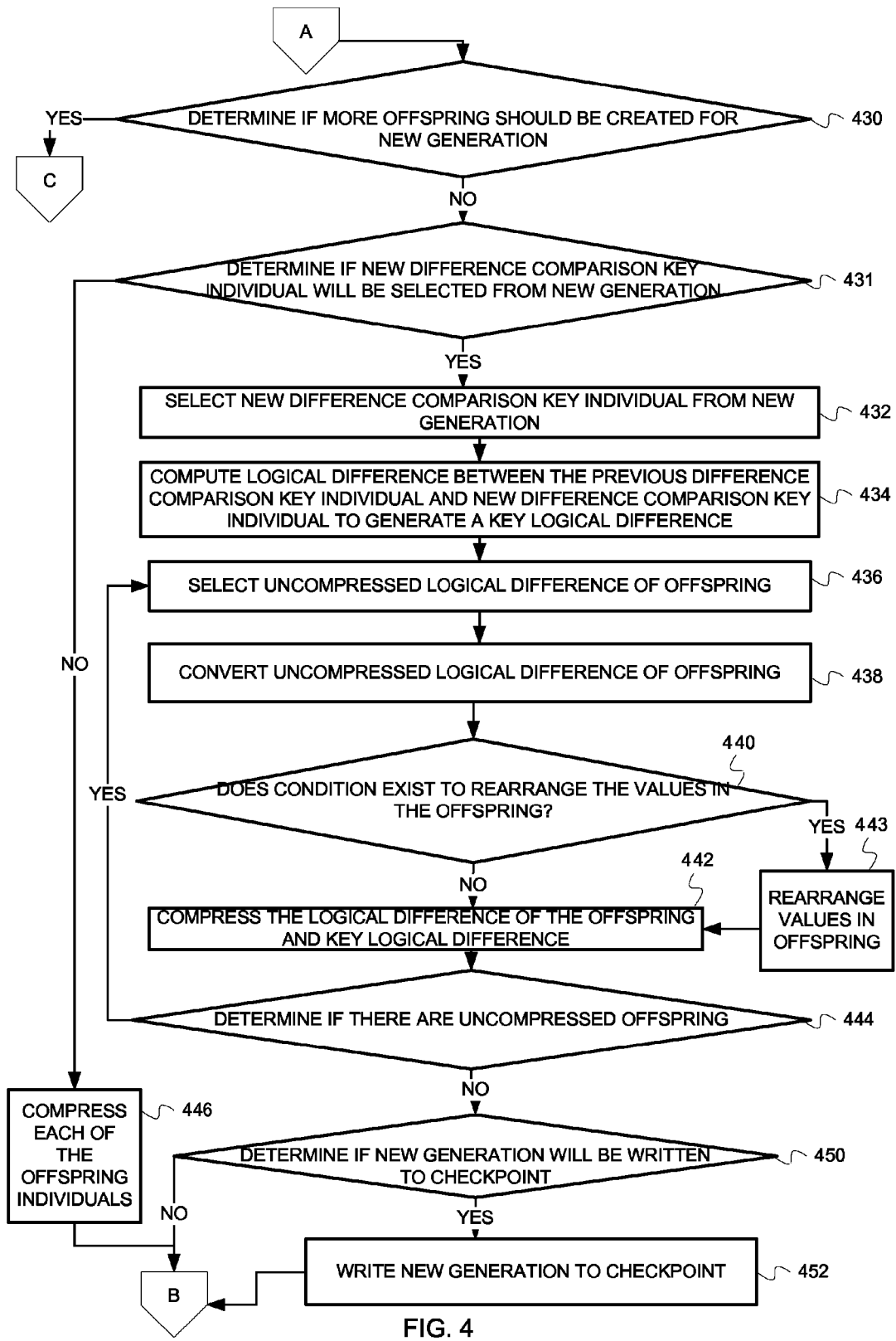

FIGS. 3 and 4 depict flow charts of example operations for an optimization simulation with compressed individuals. At block 302, a problem description is detected. The problem description can indicate variables of the optimization problem, a domain for the candidate solutions, a fitness evaluation function, seed candidate solutions, criteria for inserting the seed candidate solutions, termination criteria, etc.

At block 304, an initial generation ("first generation") based on the problem description is generated. In some instances, the first generation can include any number of randomly created individuals. Each individual represents a possible candidate solution for the problem description.

At block 306, the first generation is detected and a difference comparison key is selected from the first generation. The difference comparison key can be the first generated individual, a random individual from a first generation, or a key based on bit frequencies. In some embodiments, a difference comparison key based on bit frequencies ("bit frequency key") can be created by analyzing the most common values for each bit in each individual and creating a difference comparison key outside the first generation that corresponds to the most common bit values in the first generation. Since the bit frequency key is not an individual in the first generation, storing the bit frequency key uses additional memory space. In other embodiments, a difference comparison key can be selected by analyzing the most common values for each bit in each individual and selecting an individual with the most common bit values. Utilizing a difference comparison key based on bit frequencies can increase the efficiency of compression because the difference comparison key can share more bits in common with individuals in the first generation. The resulting logical differences of the difference comparison key and other individuals in the first generation may have more zeros, which would enhance compression.

At block 308, an individual is selected from the first generation. The logical difference is then computed between the difference comparison key and the selected individual (block 310). At block 312, the logical difference between the difference comparison key and the selected individual is compressed using a compression algorithm, such as run-length encoding, sparse vector encoding, or custom compression algorithms. In some instances, individuals in the first generation may not be compressed for several generations. Delaying the compression of the individuals for several generations can increase efficiency because compression algorithms may not substantially reduce the amount of memory consumed to store early generations. Therefore, the computation time for compression of a first generation of individuals is used for other operations, rather than compressing a first generation of the individuals to save a small amount of memory space. However, once the randomly created individuals in the first generation begin to share common values with each other, compression can sometimes significantly reduce the amount of memory space used to store the individuals of the first generation.

One example compression technique that can be used is run-length encoding. Run-length encoding compresses a string of bits. If a string of bits contains two values, such as "0's" and "1's," then run-length encoding will replace each instance of consecutive bit values with the length of the consecutive bit values and the bit value itself For example, if a 24-bit string has the hexadecimal value "0x007000", then there are three instances of consecutive bit values ("000000000," "111," and "000000000000"). A run-length compression algorithm utilizing 5 bits to encode a run, where the first 4 bits are utilized to encode the length and the $5^{th}$ bit is utilized to encode the binary value, can compress this string to 15 bits, specifically "10010 00111 11000," or, equivalently 0x48F8 in hexadecimal. This gives a 24-to-15 compression ratio.

In some instances, sparse vector encoding is utilized for compression. A sparse vector encoding could store the location of every "1" from a bit string in a vector. For example, if a bit string contains the values "0000000001100000," the vector will store the location for the two "1's". The 16-bit string can then be converted to a vector that includes the position of each of the "1" values, i.e. locations 9 and 10, represented as two 4-bit hexadecimal digits as "0x9A." This gives a 2-to-1 compression ratio.

In some embodiments, custom compression algorithms can be used for compression. For instance, a 24-bit string containing the values "000000000000000011000000" (0x00c0 in hexadecimal) could be compressed using an algorithm that considers the bit string on a byte by byte basis, and assumes most bits to be of value '0'. The compression algorithm begins by scanning the string from beginning to end. If consecutive bytes have a zero value, then the zero valued bytes could be replaced with a 9-bit value indicating the length of the consecutive zero bytes and an indicator bit that indicates the consecutive bytes contain zero values. If a byte has a non-zero value, then the value of the byte can be stored unmodified with an indicator bit that indicates the byte was taken from the uncompressed string unmodified. In the example string, the first two bytes (sixteen bits) have a zero value. Therefore, these bytes can be replaced with the byte value "2" (indicating the number of consecutive zero bytes), and an indicator bit of value "0". The third byte can be placed unmodified into the compressed string, with an indicator bit of value "1" appended. Compression using this custom algorithm can transform the string into the 18-bit value "000000100110000001" ("0x981" in hexadecimal).

The compression algorithms discussed above can be used to compress individuals in a generation or the logical differences of the individuals, which are calculated based on a difference comparison key. In some instances, compression may not be utilized in the first generation. In some embodiments, the logical differences of individuals are only compressed when the compressed logical difference of the individual consumes significantly less disk space than the uncompressed logical difference of the individual. Therefore, some of the logical differences of individuals in a generation may be compressed, while other logical differences of individuals in the generation remain uncompressed. A bit indicator stored with the logical differences of the individuals indicates if the logical differences of individuals are in a compressed or uncompressed state.

At block 314, it is determined if there are uncompressed individuals in the first generation. If there are uncompressed individuals, then the flow returns to block 308. The flow continues to compute logical differences between the difference comparison key and the remaining individuals in the first generation until all of the individuals, except for the difference comparison key, are compressed.

After the first generation has been compressed, each individual of the first generation is decompressed and evaluated at block 316. Each individual in the first generation is evaluated based on applying the values indicated in the individuals to variables in the optimization problem and running a simulation of the individual (which represents a candidate solution). Evaluation of a generation can be defined as part of the fitness evaluation function indicated in the problem description At block 318, the fitness of a generation is determined. The fitness is represented by a numerical value within a range specified in the problem description. For example, the fitness can be represented by a percentage. Determining the fitness of a generation comprises determining individual fitness metrics of each uncompressed logical difference of a candidate solution. The fitness of a generation can also be determined based on aggregating the individual fitness metrics. Each candidate solution's individual fitness metric is based on the fitness evaluation function indicated in the problem description.

At block 320, it is determined if termination criterion has been met. The problem description indicates the termination criterion. For example, the optimization algorithm simulation may terminate when fitness of a generation reaches an indicated satisfactory level.

When the termination criterion has been met, then the fittest individual from the generation is selected as the solution to the optimization problem and the flow ends at block 321.

If the termination criterion has not been met, then two fit individuals are selected from the generation at block 324.

The selected fit individuals are then decompressed with the appropriate compression algorithm at block 326. For instance, if a run-length encoding compression algorithm was used to compress the logical difference of the individual, then the result of the run-length encoding can be decompressed to yield the logical difference of the individual. If there are any individuals that are not selected for crossover, they are not decompressed. By keeping the unfit individuals in a compressed state, the process is more efficient and saves memory space.

At block 328, crossover (also referred to as "reproduction") is performed on the selected decompressed fit individuals to create the individuals of the next generation (also referred to herein as "offspring"). In some instances, a certain number of the individuals of the previous generation can remain unchanged after reproduction, based on survival of the fittest techniques. The unchanged individuals can represent a portion of the offspring. As another example, another portion of the offspring can be generated based on asexually mutating the fit individuals used for reproduction. The mutation process can include changing the values of randomly selected bits in the offspring after crossover occurs or changing the values of randomly selected bits in the selected decompressed fit individuals before crossover occurs. If the sparse vector compression algorithm is utilized, then it is possible to introduce a mutation in an individual without decompression. Since the sparse vector indicates the positions of each "1"

value in an individual, a "1" value can be inserted or removed from a random location in the sparse vector to simulate a mutation.

At this point, the flow moves from block 328 in FIG. 3 to block 430 in FIG. 4. At block 430, it is determined if more offspring are to be created for the next generation. If more offspring are to be created, then the flow can return to block 324.

At block 431, it is determined if a new difference comparison key will be determined for the next generation. In some instances, the previous difference comparison key may be used for several generations.

If a new difference comparison key is not selected, then each of the individuals in the offspring can be compressed at block 446. The compressed offspring are then evaluated at block 316.

At block 432, a new difference comparison key is selected using the same key selection methods as the initial generation (first offspring generated, a random individual, or an individual based on bit frequencies). After numerous generations, many of the individuals may begin to have identical bit values. By selecting a difference comparison key that shares a large number of values with the majority of the individuals in a generation, the logical difference can contain a larger number of zeros which can enhance compression. Therefore, a difference comparison key based on bit frequencies ("bit frequency key") can enhance compression after several generations. In some embodiments, the bit frequency key may be based on individuals in a previous generation. A bit frequency key can increase the amount of memory space used to store a generation because the bit frequency key is not an individual of the generation.

At block 434, the logical difference is then calculated between the previous difference comparison key and the new difference comparison key to generate a key logical difference.

At block 436, an uncompressed logical difference of an offspring individual is selected.

At block 438, the uncompressed logical difference offspring individual is converted. The conversion includes computing a logical difference between the selected uncompressed logical difference of an offspring individual and the key logical difference to generate a logical difference of the offspring individual of the new generation.

In some instances, the logical difference of the offspring individual can be rearranged to enhance compression at block 440. As discussed above, individuals can include values. In order to maximize compression efficiency, the values that are identical in many of the offspring individuals can be moved to the front of all the offspring individuals. The order in which the bit values of the offspring individuals are rearranged (also referred to herein as a "rearrangement sequence") can be stored. The rearrangement of bit values in the offspring individuals can result in more consecutive zero bits, which can lead to a shorter compressed individual. The rearrangement sequence can be used to reverse the rearrangement of the bit values in the offspring individuals whenever the offspring individuals are computed, such as for evaluation.

If it is determined that the values in a logical difference of the offspring individual should be rearranged, then the values in the logical difference of the offspring individual are rearranged at block 443.

At block 442, the logical difference of the selected individual in the offspring and the key logical difference is compressed using a compression algorithm.

It is then determined at block 444 if there are offspring individuals in the new generation that have not been compressed. If there are uncompressed offspring individuals, then the flow returns to block 434. Once all of the individuals of the offspring have been compressed, then the flow returns to block 316 to evaluate the new generation.

At block 450, it is determined whether the compressed logical differences that represent the offspring will be copied to checkpoints in persistent storage.

At block 452, the compressed logical differences of the offspring are written to checkpoints. In the event of a system crash, checkpoints allow the computer system to resume computation of a solution with subsequent generations, rather than restarting the process with the first generation.

It should be understood that FIGS. 1, 3, and 4 are examples meant to aid in understanding embodiments and should not be used to limit embodiments or limit scope of the claims. Embodiments may perform additional operations, fewer operations, operations in a different order, operations in parallel, and some operations differently. For instance, after each individual is generated in the first generation at block 304 of FIG. 3, the individual can be evaluated while other individuals are generated.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
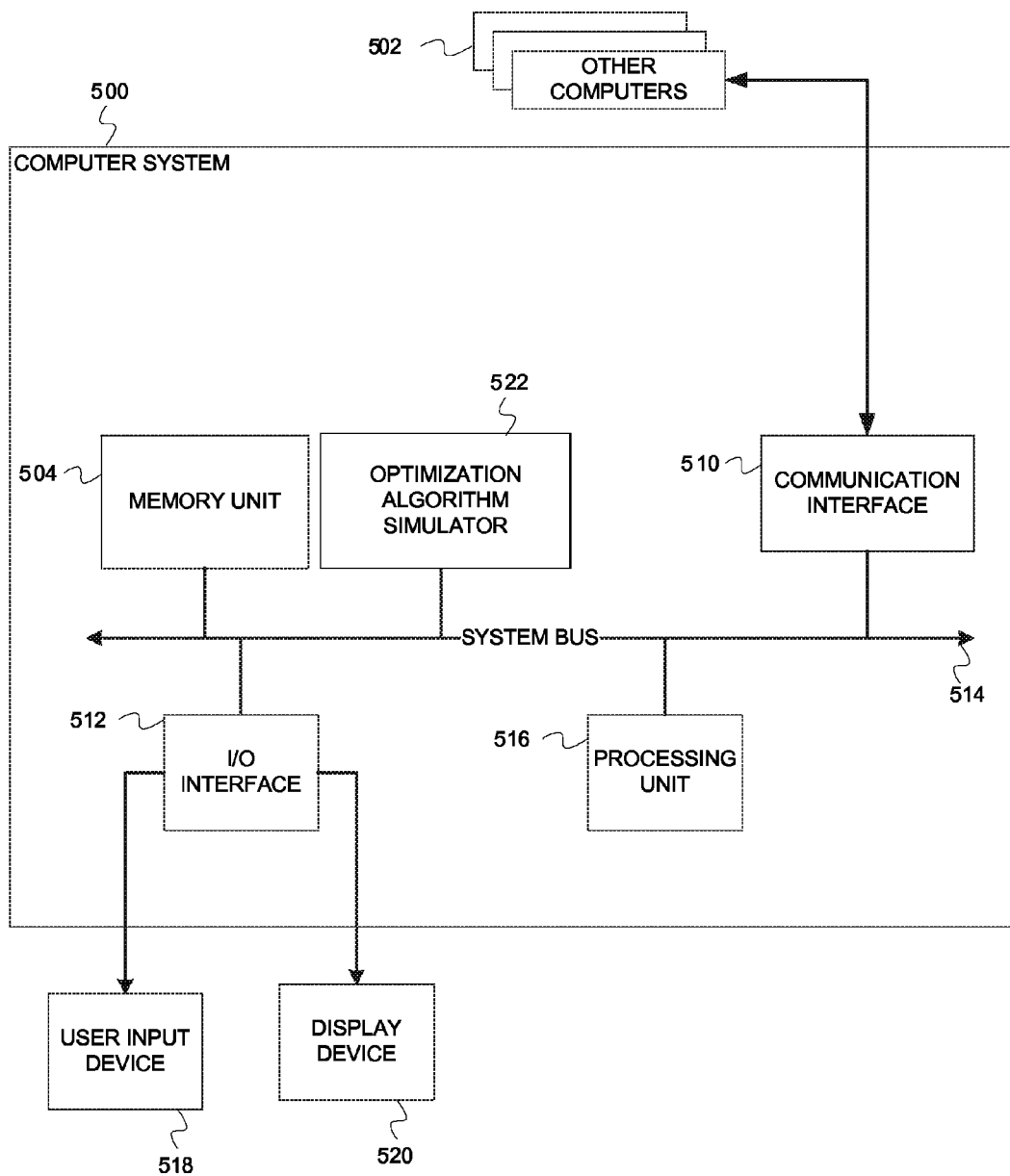
FIG. 5 depicts an example computer system.

FIG. 5 depicts an example computer system. A computer system 500 includes a processor unit 516 (possibly including multiple processors, multiple cores, multiple nodes, and/or implementing multi-threading, etc.). The computer system 500 also includes a memory unit 504. The memory unit 504 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 514 (e.g., PCI, ISA, PCI-Express, HyperTransport®, InfiniBand®, NuBus, etc.), a communication interface 510 (e.g., an ATM interface, an Ethernet interface, a Frame Relay interface, SONET interface, wireless interface, etc.) and an I/O (input/output) interface 512. The communication interface allows the computer system 500 to communicate (e.g., send and receive data) with other computers 502. Input/output interface adapters in computers can implement user-oriented input/output through, for example, software drivers and computer hardware. The I/O interface may utilize various display devices 520, such as computer display screens, and various user input devices 518, such as keyboards and mice.

The computer system 500 also includes an optimization algorithm simulator 522, which embodies functionality to implement embodiments described above. The optimization algorithm simulator 522 may include one or more functionalities that facilitate compressing and decompressing individuals in computer-based metaheuristics. Any one of these functionalities may be partially (or entirely) implemented in hardware and/or on the processing unit 516. For example, the functionality may be implemented with an application specific integrated circuit, in logic implemented in the processing unit 516, in a co-processor on a peripheral device or card, etc. Any one of these functionalities may also be partially (or entirely) implemented in software residing in the memory unit 504. Further, realizations may include fewer or additional components not illustrated in FIG. 5 (e.g., video cards, audio cards, additional network interfaces, peripheral devices, etc.). The processor unit 516, the I/O interface 512, and the communication interface 510, are coupled to the bus 514. Although illustrated as being coupled to the bus 514, the memory unit 504 may be coupled to the processor unit 516.

While the embodiments are described with reference to various implementations and exploitations, it will be understood that these embodiments are illustrative and that the scope of the inventive subject matter is not limited to them. In general, techniques for compression and decompression in computer-based metaheuristics, as described herein, may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
 determining a difference comparison key for a plurality of individuals, wherein each of the individuals comprises a candidate solution for an optimization problem;
 computing logical differences between the difference comparison key and the plurality of individuals;
 compressing each of the logical differences to generate a plurality of compressed individuals; and
 using the plurality of compressed individuals in an optimization simulation to generate a solution for the optimization problem.

2. The method of claim 1, wherein said determining the difference comparison key for the plurality of individuals comprises one of selecting one of the individuals as the difference comparison key, generating the difference comparison key based on the individuals, and generating the difference comparison key based on a second plurality of individuals.

3. The method of claim 2, wherein said selecting the difference comparison key comprises one of randomly selecting one of the individuals and selecting a first individual.

4. The method of claim 2, wherein said generating the difference comparison key based on the individuals comprises:
   determining a plurality of common values in the individuals; and
   generating a difference comparison key that comprises the plurality of common values.

5. The method of claim 2, wherein said generating the difference comparison key based on the second plurality of individuals comprises:
   determining a plurality of common values in the second plurality of individuals, wherein a first generation comprises the second plurality of individuals and the first generation precedes a second generation that comprises the plurality of individuals; and
   generating a difference comparison key that comprises the plurality of common values.

6. The method of claim 1, further comprising:
   determining a new difference comparison key from a second plurality of offspring individuals derived from the plurality of individuals;
   computing a second logical difference between the difference comparison key and the new difference comparison key;
   computing a plurality of second logical differences between the second plurality of offspring individuals and the second logical difference; and
   compressing the plurality of second logical differences to generate a compressed second plurality of offspring individuals.

7. The method of claim 6, further comprising:
   determining a plurality of identical values within the plurality of second logical differences; and
   rearranging the plurality of identical values within each of the second logical differences to be contiguous within each of the second logical differences to generate rearranged logical differences,
   wherein said compressing the plurality of second logical differences comprises compressing each of the rearranged logical differences.

8. The method of claim 1, wherein said using the compressed plurality of compressed individuals in an optimization simulation to generate a solution for the optimization problem comprises:
   decompressing a first of the plurality of compressed individuals to generate a first of the logical differences;
   generating a first of the individuals based on the first of the logical differences and the difference comparison key; and
   evaluating a fitness of the first of the individuals while others of the plurality of compressed individuals remain compressed.

9. The method of claim 8, further comprising:
   discarding the first of the logical differences while maintaining the first of the plurality of compressed individuals.

10. The method of claim 1, wherein said compressing each of the logical differences further comprises:
    scanning a first of the plurality of individuals for a plurality of consecutive bytes comprised of zeros;
    replacing the plurality of consecutive bytes comprised of zeros with a bit indicating a string of bytes comprised of consecutive zeros and a length of the string of bytes comprised of consecutive zeros;
    scanning the first of the plurality of individuals for a plurality of bytes that have a non-zero value; and
    replacing each of the plurality of bytes that have a non-zero value with a bit indicating a byte including a non-zero value and a value of the byte.

11. The method of claim 1, wherein said compressing each of the logical differences further comprises:
    performing a mutation or a crossover on a plurality of compressed logical differences, wherein said compressing is in accordance with sparse vector encoding.

12. The method of claim 1, wherein the plurality of individuals has been preceded by a plurality of earlier pluralities of individuals.

13. The method of claim 1, wherein compressing each of the logical differences to generate a plurality of compressed individuals further comprises:
    writing the plurality of compressed individuals to a checkpoint in a persistent storage.

14. A computer program product for compressing and decompressing a plurality of individuals, the computer program product comprising:
    a non-transitory computer readable storage medium having computer readable program code embodied therewith, the computer readable program code configured to,
    determine a difference comparison key for the plurality of individuals, wherein each of the individuals comprises a candidate solution for an optimization problem;
    decompress a first of a plurality of compressed individuals to generate a first of a plurality of logical differences, wherein each of the compressed individuals represent a candidate solution to an optimization problem; and
    evaluate a fitness of the first of the plurality of logical differences while others of the plurality of compressed individuals remain compressed.

15. The computer program product of claim 14, wherein the computer readable program code being configured to evaluate the fitness of the first of the plurality of logical differences while others of the plurality of compressed individuals remain compressed comprises the code being configured to restore the first of the plurality of logical differences to a first of the individuals with a difference comparison key for the plurality of individuals, wherein the first of the plurality of logical differences represents a logical difference between the difference comparison key and the first of the individuals.

16. A computer program product for running an optimization simulator, the computer program product comprising:
    a non-transitory computer readable storage medium having computer usable program code embodied therewith, the computer usable program code configured to,
    determine a difference comparison key for a plurality of individuals, wherein each of the individuals comprise a candidate solution for an optimization problem;
    compute a plurality of logical differences between the difference comparison key and the plurality of individuals;

compress each of the logical differences to generate a plurality of compressed individuals; and use the plurality of compressed individuals in an optimization simulation to generate a solution for the optimization problem.

17. The computer program product of claim 16, wherein the computer readable program code being configured to determine the difference comparison key for the plurality of individuals comprises the computer readable program code being configured to perform one of select one of the individuals as the difference comparison key, generate the difference comparison key based on the individuals, and generating the difference comparison key based on a second plurality of individuals.

18. The computer program product of claim 17, wherein the computer readable program code being configured to select the difference comparison key comprises the computer readable program code being configured to perform one of randomly select one of the individuals and select a first individual.

19. The computer program product of claim 17, wherein the computer readable program code being configured to generate the difference comparison key based on the individuals, is further configured to:

determine a plurality of common values in the individuals; and generate a difference comparison key that comprises the plurality of common values.

20. The computer program product of claim 16, wherein the computer readable program code is further configured to:

determine a new difference comparison key from a second plurality of offspring individuals derived from the plurality of individuals;

compute a second logical difference between the difference comparison key and the new difference comparison key;

compute a plurality of second logical differences between the second plurality of offspring individuals and the second logical difference; and compress the plurality of second logical differences to generate a compressed second plurality of offspring individuals.

21. The computer program product of claim 20, wherein the computer readable program code is further configured to:

determine a plurality of identical values within the plurality of second logical differences; and rearrange the plurality of identical values within each of the second logical differences to be contiguous within each of the second logical differences to generate rearranged logical differences, wherein the computer readable program code being configured to compress the plurality of second logical differences comprises the computer readable program code being configured to compress each of the rearranged logical differences.

22. An apparatus comprising:

a processor;

a memory unit coupled with the processor; and an optimization algorithm simulator configured to:

determine a difference comparison key for a plurality of individuals, wherein each of the individuals comprise a candidate solution for an optimization problem;

compute a plurality of logical differences between the difference comparison key and the plurality of individuals;

compress each of the logical differences to generate a plurality of compressed individuals; and use the plurality of compressed individuals in an optimization simulation to generate a solution for the optimization problem.

23. The apparatus of claim 22, wherein the optimization algorithm simulator being configured to determine the difference comparison key for the plurality of individuals comprises the optimization algorithm simulator being configured to perform one of select one of the individuals as the difference comparison key and generate the difference comparison key based on the individuals.

24. The apparatus of claim 23, wherein the optimization algorithm simulator being configured to select the difference comparison key comprises the optimization algorithm simulator being configured to perform one of randomly select one of the individuals and select a first individual.

25. The apparatus of claim 23, wherein the optimization algorithm simulator being configured to generate the difference comparison key based on the individuals, is further configured to:

determine a plurality of common values in the individuals; and generate a difference comparison key that comprises the plurality of common values.

* * * * *